UNITED STATES PATENT OFFICE.

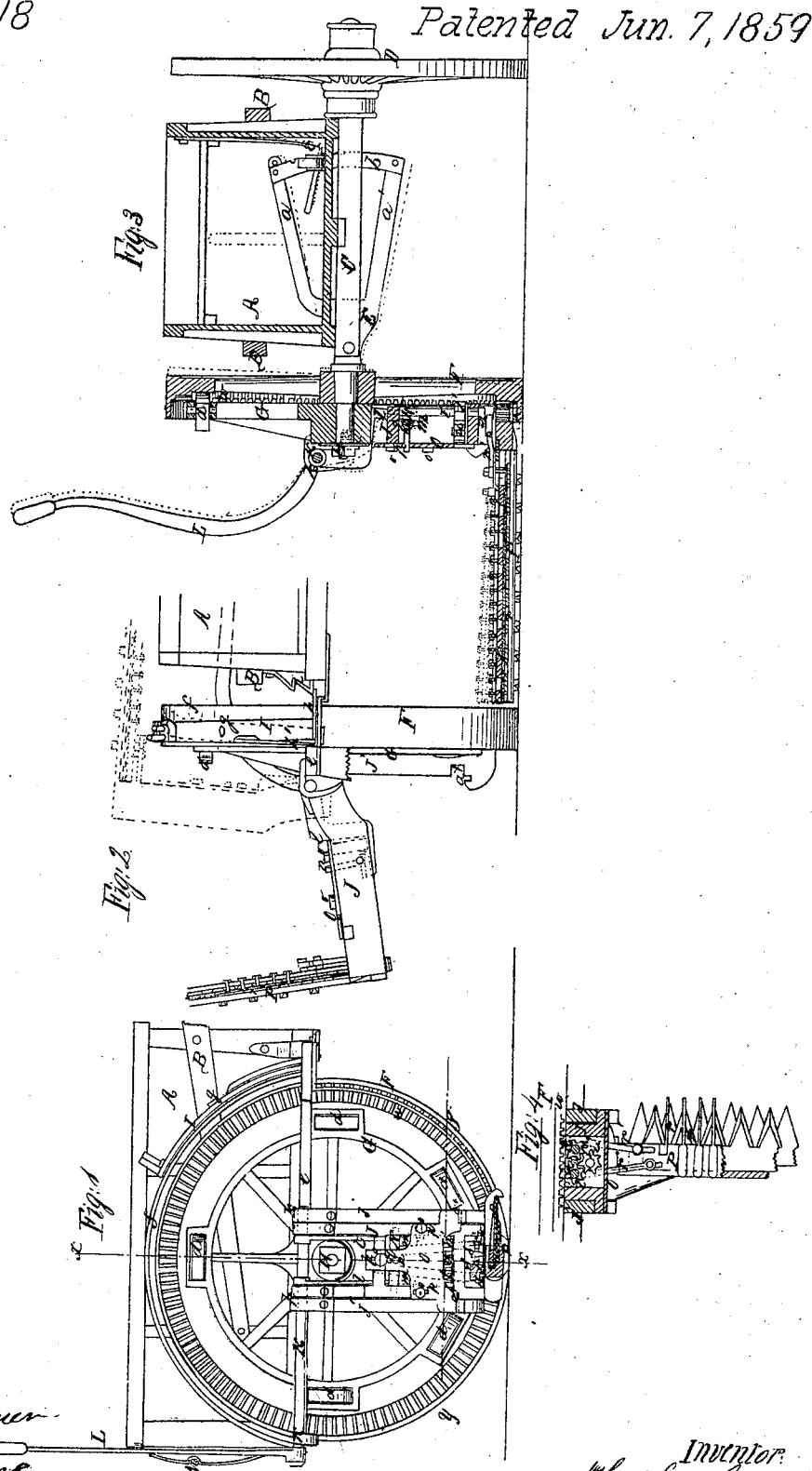

H. H. LUTHER, OF WARREN, RHODE ISLAND.

IMPROVEMENT IN HARVESTING-MACHINES.

Specification forming part of Letters Patent No. 24,318, dated June 7, 1859.

*To all whom it may concern:*

Be it known that I, H. H. LUTHER, of Warren, in the county of Bristol and State of Rhode Island, have invented a new and Improved Harvester; and I do hereby declare that the following is a full, clear, and exact description of the same, reference being had to the annexed drawings, making a part of this specification, in which—

Figure 1 is a side view of a harvester constructed according to my invention, the finger-bar and sickle being bisected transversely. Fig. 2 is a front view of the working parts of the same. Fig. 3 is vertical section of the same, taken in the line $x\ x$, Fig. 1. Fig. 4 is a horizontal section of a portion of the same, taken in the line $y\ y$, Fig. 1.

Similar letters of reference indicate corresponding parts in the several figures.

The object of this invention is to place the finger-bar and sickle under the complete control of the driver, so that the sickle may with great facility be raised to pass over obstructions, be adjusted to cut the grass or grain at any desired height from the ground, and also be raised and adjusted over on the body of the machine when the latter is not in use or is being moved from place to place.

The invention consists in attaching the finger-bar to a swinging frame, which is secured to a rotating frame adjoining an adjustable driving-wheel, both frames being provided with suitable catches, and the whole arranged as hereinafter fully described, whereby the desired object is attained.

To enable those skilled in the art to fully understand and construct my invention, I will proceed to describe it.

A represents a rectangular box, which forms the body of the machine. This box is provided with thills B B, and an axle, C, is attached to its under side, said axle having a wheel, D, attached directly to it at one end, the opposite end having a lever or bar, E, fitted in it, to which the other wheel, F, is attached. This lever or bar E is forked at its inner end, or has two arms, $a\ a'$, attached, one of which, $a$, passes up within the body A, and the other, $a'$, projects below the axle C, as plainly shown in Fig. 3. The ends of the arms $a\ a'$ are connected by a segment rack-bar, $z$, into which a spring-catch, $c$, in the body A catches, and retains the wheel F in a vertical position or at different degrees of inclination. This will be understood by referring to Fig. 3.

On the outer end of the lever or bar E a wheel or circular frame, G, is placed. This wheel or frame is smaller in diameter than the wheel F, which is the driving-wheel. The wheel or frame G is secured on the end of the lever or bar E by a nut, H, and at the periphery of said wheel or frame friction-rollers $d$ are placed, said rollers bearing against the outer side of wheel F, as shown clearly in Fig. 3. A cross-bar, $e$, of the wheel or frame G extends a trifle beyond the periphery of the wheel F, and the ends of a semicircular bar, $f$, are attached to the ends of this bar $e$, said bar $f$ extending around the upper part of the wheel F.

To the front part of the semicircular bar $f$ a lever, I, is attached by a fulcrum-pin, $g$.

To the lower end of the lever I a plate, $h$, is attached, and a spring, $h'$, bears against the outer edge of the lower part of the lever I, said spring having a tendency to keep the plate $h$ underneath either of a series of projections, $i$, attached to the side of the body A.

To the bar $e$ of the wheel or frame G two pendent bars, $j\ j$, are attached at right angles. These bars $j\ j$ form a recess for the reception of a rectangular swinging frame, J, the upper end of which is fitted loosely on a shaft, K, which has its bearings $k$ on the wheel or frame G.

To the back end of the shaft K a lever, L, is attached, which lever may be retained in a horizontal position by a spring-catch, M, which is secured to the back of the body A, as shown in Fig. 1.

To the front end of the shaft K two arms, $l\ l$, are attached. These arms $l\ l$ are within the frame J and extend behind it, as shown in Fig. 3.

Within the frame J a shaft, N, is placed transversely. This shaft has two pendants, $m\ m$, attached to it, and an arm, $n$, which passes through a slide-plate, O, which is secured on the outer side of the frame J by screws $o$, which pass through oblong slots $p$ in the plate, and while securing the plate to the frame J allow it to work or play thereon to a certain extent. The arm $n$, in consequence of a spring, $q$, has a tendency to keep the plate O in recesses $a^x$ in the lower parts of the bars $j j$, said plate thereby serving as a catch to retain the frame J between the bars $j j$.

To the lower end of the frame J a finger-bar, P, is attached at right angles. The finger-bar has two sickles, $r\ r$, attached to it, and placed one over the other. The teeth of the upper sickle work over those of the lower one, and the sickles move in opposite directions and operate similar to shears. The sickles $r\ r$ are operated by cranks $s\ s$, which are placed on shafts $t\ t$ in the frame J, said cranks being placed in opposite positions relatively with each other and connected with the sickles $r$ by rods $r'$. On each shaft $t$ a pinion, $t'$, is placed, and these two pinions gear into a wheel, $u$, which serves to keep the two cranks $s\ s$ in a proper relative position with each other, and on the lower end of each shaft a pinion, $v$, is placed. When the frame J is down and fitted between the bars $j j$ the pinions $v\ v$ of the shafts $l$ gear into teeth $w$ on the outer side of the wheel F. (See Figs. 1 and 3.)

The operation is as follows: When the frame J is secured between the bars $j j$ and the machine is drawn along, the teeth of wheel F gearing into the pinions $v\ v$ of the shafts $t\ t$, the sickles $r\ r$ are vibrated in reverse directions by means of the cranks $s\ s$ and rods $r'\ r'$. In turning the machine, or at any time when the cutting operation is necessarily suspended as the machine moves, the driver from his seat in the body A, and with his foot, throws the catch $c$ out of gear from the segment rack-bar $b$, and by the same means presses down the bar $a$, and consequently gives the driving-wheel F an inclined position and throws up the finger-bar and sickles, as shown in red, Fig. 3. By this means the sickles are thrown above the grass or grain and are rendered almost inoperative, so far as the cutting is concerned, although still vibrating with the movement of the wheel F. In case the finger-bar and sickles require to be considerably elevated in order to pass over large obstructions or to pass between bar-posts or through gates, the driver grasps the lever L, which is within his reach, and, drawing it toward him, elevates the finger-bar and sickles, as shown in black, Fig. 2, and the finger-bar and sickles may be retained in such position by means of the spring M.

When the machine is not in use, or when it is being drawn from place to place, the finger-bar and sickles are raised over and placed on the top of the body A, as shown in red, Fig. 2. These two latter adjustments of the finger-bar and sickles are permitted on account of the frame J, to which the finger-bar P is attached, being allowed to swing freely on the shaft K.

It will be recollected that the plate O was described as performing the function of a catch and retaining the frame J between the bars $j j$, and consequently the sickles in proper position. In order, therefore, to elevate the finger-bar and sickles, it is necessary that the plate O be first raised free from the recesses or notches at the lower parts of the bars $j j$. This is effected by the movement of the lever L, the arms $l\ l$ on the front part of the shaft K striking the pendants $m\ m$ of shaft N and causing the arm $n$ of said shaft N to elevate the plate O. The arms $l\ l$, as soon as they perform this office, force upward the frame J. In order to adjust the sickles to cut the grass or grain at different heights, the circular frame G is adjusted so as to elevate the front ends of the sickles to the requisite height. This adjustment of the frame G is permitted on account of the frame G being fitted loosely on the same arm as the wheel F. The frame G is secured at any desired point by means of the plate $h$ of the lever I catching under either of the projections $i$.

From the above description it will be seen that the sickle is placed under the complete control of the driver. It may be elevated and depressed to pass over obstructions either large or small, or to pass through gates, and also adjusted to cut the grass or grain higher or lower, as desired, or be raised and placed on the body of the machine when the latter is being moved from place to place.

I do not claim broadly attaching the finger-bar to the machine by a hinge or joint or by a hinged frame irrespective of the arrangement of parts shown and their relation to each other; but,

Having thus described my invention, what I claim as new, and desire to secure by Letters Patent, is—

1. Attaching the finger-bar P to the frame J, suspended on the shaft K and fitted between bars $j j$ on frame G, and arranged on shaft H, substantially as shown, so that the finger-bar and sickles may, when necessary, be elevated and placed directly over the main wheel and shaft, as described.

2. Adjusting the finger-bar P and sickles $r\ r$ in a more or less inclined position, in order to cut the grass or grain the desired height, by having the finger-bar attached to a circular frame, G, fitted on the arm of the driving-wheel F, and secured at the desired point by means of the lever I and projections or any equivalent fastening.

3. The arrangement and combination of the frames J G, applied to the driving-wheel F, in connection with the gearing $w$, $t'\ t'$, $u$, and $v\ v$, respectively, on the wheel F, shafts $t\ t$, and in the frame J, substantially as and for the purpose set forth.

H. H. LUTHER.

Witnesses:
ALFRED B. GARDNER,
THOMAS I. GOFF.